United States Patent
Suzuki et al.

(10) Patent No.: US 8,691,466 B2
(45) Date of Patent: Apr. 8, 2014

(54) MEMBRANE ELECTRODE ASSEMBLY FOR FUEL CELL

(75) Inventors: Shuichi Suzuki, Hitachi (JP); Jun Kawaji, Hitachi (JP); Osamu Kubota, Tokai (JP); Yoshiyuki Takamori, Hitachinaka (JP); Makoto Morishima, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 507 days.

(21) Appl. No.: 12/370,729

(22) Filed: Feb. 13, 2009

(65) Prior Publication Data

US 2009/0233136 A1 Sep. 17, 2009

(30) Foreign Application Priority Data

Mar. 13, 2008 (JP) ................. 2008-063457

(51) Int. Cl.
*H01M 8/24* (2006.01)

(52) U.S. Cl.
USPC ........................ 429/457; 429/514; 429/456

(58) Field of Classification Search
USPC .................................... 429/30, 457
See application file for complete search history.

(56) References Cited

U.S. PATENT DOCUMENTS

| 2005/0260476 | A1 | 11/2005 | Xie |
| 2006/0068269 | A1* | 3/2006 | Fukuda et al. ............ 429/44 |
| 2006/0093893 | A1* | 5/2006 | Matsuo et al. ............ 429/44 |
| 2008/0261097 | A1 | 10/2008 | Kubota et al. |

FOREIGN PATENT DOCUMENTS

| JP | 08-088008 | | 4/1996 |
| JP | 08-162123 | | 6/1996 |
| JP | 2005-174646 | | 6/2005 |
| JP | 2005-294167 | | 10/2005 |
| JP | 2005294167 A | * | 10/2005 ............. H01M 8/02 |
| JP | 2005-332672 | | 12/2005 |
| JP | 2006-32170 | | 2/2006 |
| JP | 2006-236631 | | 9/2006 |
| JP | 2008-269902 | | 11/2008 |

OTHER PUBLICATIONS

Japanese Office Action Appln. No. 2008-063457 dated Jun. 29, 2010.

* cited by examiner

*Primary Examiner* — Barbara Gilliam
*Assistant Examiner* — Gary Harris
(74) *Attorney, Agent, or Firm* — Antonelli, Terry, Stout & Kraus, LLP.

(57) ABSTRACT

The present invention provides a method of preventing liquid fuel that has penetrated from an anode from reaching a cathode and of effectively utilizing a cathode catalyst, which provides a membrane electrode assembly for fuel cell having high output density. In a membrane electrode assembly for fuel cell including an anode formed of a catalyst and a solid polymer electrolyte, a cathode formed of a catalyst and a solid polymer electrolyte, and a solid polymer electrolyte membrane formed between the anode and the cathode, an intermediate layer is formed between the cathode and the electrolyte membrane.

8 Claims, 5 Drawing Sheets

MEMBRANE ELECTRODE ASSEMBLY FOR FUEL CELL

BACKGROUND OF THE INVENTION

1. Field of the Invention

The present invention relates to a membrane electrode assembly used in a fuel cell.

2. Description of the Related Art

An increased amount of information due to advancement of electronics in recent years has resulted in a demand for processing of the increased information with higher speed and quality. Hence, a power supply with high output density and high energy density, i.e., a power supply with longer continuous operating time is needed.

A demand for a small generator that does not require charging, i.e., a microgenerator that can be easily refueled, has been growing. Under these circumstances, importance of fuel cells is being reviewed.

A fuel cell is a generator including at least: a solid or liquid electrolyte, and two electrodes, i.e., an anode and a cathode, which induce desired electrochemical reactions, and directly converts chemical energy of fuel in the fuel cell into electric energy, with high efficiency.

Among such fuel cells, a fuel cell that uses a solid polymer electrolyte membrane as an electrolyte membrane, and hydrogen as fuel is referred to as a polymer electrolyte fuel cell (PEFC), while a fuel cell that uses a solid polymer electrolyte membrane as an electrolyte membrane, and methanol as fuel is referred to as a direct methanol fuel cell (DMFC). In particular, the DMFC using liquid fuel has attracted attention as being effective as a portable or handheld small power supply because of high volumetric energy density of the fuel.

It is desirable to make a DMFC generating system as small as possible when the DMFC generating system is used as a portable or handheld power supply. Thus, the output density of a membrane electrode assembly, which is a power generating element of the DMFC, needs to be made higher.

In the DMFC, liquid fuel is supplied to the anode for oxidizing the fuel and air is supplied to the cathode for reducing oxygen, and a part of the liquid fuel penetrates through the solid polymer electrolyte membrane and moves to the cathode. This causes the cathode to be immersed in the liquid fuel having penetrated, thereby blocking the supply of the air. As a result, the output density is reduced.

In order to improve the output density of the DMFC, it is necessary to improve diffusivity of air into the cathode and thereby supply as much oxygen as possible to a cathode catalyst. For example, Japanese Patent Application Publication Nos. Hei 8-88008 and Hei 8-162123 describe methods of improving diffusivity of air by designing the cathode so that the farther away from the solid polymer electrolyte membrane a portion of the cathode is, the fewer amount of the solid polymer electrolyte the portion contains.

In addition, in the DMFC, it is desirable that a membrane electrode assembly, which is the heart of power generation, have a long life. In the DMFC, as power generation continues, a solid polymer electrolyte membrane is damaged in the vicinities of the ends of each electrode, and thus a large amount of liquid fuel flows into the cathode, which significantly deteriorates cell performance.

SUMMARY OF THE INVENTION

However, even the methods described in Japanese Patent Application Publication Nos. Hei 8-88008 and Hei 8-162123 cannot prevent the liquid fuel penetrating from the anode from filling holes on the electrolyte side of the cathode. Consequently, the supply of the air to the cathode catalyst is blocked, and thus the output density of the fuel cell is reduced.

In addition, no measure against the damage of the solid polymer electrolyte membrane has been taken.

Hence, the present invention provides a method of preventing liquid fuel penetrating from an anode from reaching a cathode and effectively utilizing a cathode catalyst, and thereby provides a membrane electrode assembly for fuel cell having high output density.

The present invention also provides a membrane electrode assembly for fuel cell with a long life by controlling any damage to a solid polymer electrolyte membrane.

A membrane electrode assembly for fuel cell according to an aspect of the present invention includes: an anode including a catalyst and a solid polymer electrolyte; a cathode including a catalyst and a solid polymer electrolyte; a solid polymer electrolyte membrane formed between the anode and the cathode; and an intermediate layer located between the cathode and the solid polymer electrolyte membrane.

In addition, the intermediate layer is preferably a porous layer containing a hydrogen ion conducting material. It is preferable to use a solid polymer electrolyte as the hydrogen ion conducting material and a carbon black as a material providing porous character.

It is also preferable that the amount of the solid polymer electrolyte per unit volume contained in the intermediate layer be larger than the amount of the solid polymer electrolyte per unit volume contained in the cathode.

It is also preferable that a water contact angle of the solid polymer electrolyte contained in the intermediate layer be smaller than a water contact angle of the solid polymer electrolyte contained in the cathode.

A membrane electrode assembly for fuel cell according to another aspect of the present invention includes: an anode including a catalyst and a solid polymer electrolyte; a cathode including a catalyst and a solid polymer electrolyte; a solid polymer electrolyte membrane formed between the anode and the cathode, and at least one of an intermediate layer located between the cathode and the solid polymer electrolyte membrane and an intermediate layer located between the anode and the solid polymer electrolyte membrane, each intermediate layer having a larger area than the corresponding one of the cathode and anode.

It is also possible to make a fuel cell or a fuel-cell-power generation system equipped with a fuel cell by using such a membrane electrode assembly, a member for supplying fuel, a member for supplying air (oxygen), and a member for collecting power. A series of members for supplying fuel introduced by a pump or the like to a diffusion layer via a separator is shown as the member for supplying the fuel. In addition, a series of members for supplying the air (oxygen) introduced by a blower or the like to a diffusion layer via a separator is shown as the member for supplying the air (oxygen). Additionally, a methanol-water solution is used as fuel.

Fuel is oxidized electrochemically in the anode and oxygen is reduced in the cathode, thus resulting in a difference in electrical potential between the both electrodes. In this time, if load is applied between the both electrodes as an external circuit, ion transfer arises in the electrolyte, and electric energy is extracted to the external load. Hence, a variety of fuel cells are highly expected in a large power generating system, a small distributed cogeneration system, an electric vehicle power supply system or the like, and development for commercialization has actively taken place.

According to the present invention, it is possible to provide a membrane electrode assembly for fuel cell that has a cathode catalyst prevented from being covered by liquid fuel having penetrated from an anode, and that has high output density. It is also possible to provide a membrane electrode assembly that has a solid polymer electrolyte membrane prevented from being damaged and that has a long life.

DESCRIPTION OF THE PREFERRED EMBODIMENTS

Embodiments of the present invention will be described hereinafter.

Although a case of DMFC using a methanol-water solution as fuel is described, a membrane electrode assembly for fuel cell according to the embodiment is not limited to methanol-water fuel but is applicable to ethanol-water fuel as well. A fuel cell using liquid fuel can attain effect of improving the output density and making life longer.

Herein, as liquid fuel for the DMFC, a water solution containing 1 to 64 wt % of methanol is used.

Figure 1:
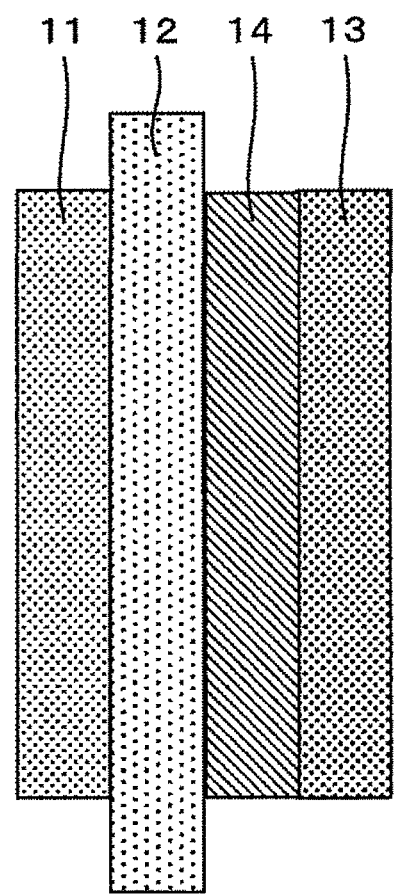
FIG. 1 is a schematic cross-sectional view showing a membrane electrode assembly for fuel cell according to an embodiment.

FIG. 1 shows a schematic cross-sectional view showing the membrane electrode assembly according to the embodiment. The assembly includes: an anode 11 and a cathode 13 arranged on both sides of a solid polymer electrolyte membrane 12, respectively; and an intermediate layer 14 between the solid polymer electrolyte membrane 12 and the cathode 13. Since the intermediate layer 14 collects any liquid fuel that has penetrated from the anode 11, the cathode 13 can be prevented from being immersed in the liquid fuel.

Herein, the anode 11 and cathode 13 are formed of a catalyst and a solid polymer electrolyte membrane. The catalyst used in the anode 11 and the cathode 13 is not particularly limited, and platinum, palladium, iridium, rhodium, ruthenium, iron, cobalt, nickel, or the like can be used. However, it is preferable that platinum-ruthenium is used in the anode 11, and platinum is used in the cathode 13.

In addition, it is preferable to use these catalysts supported on carbon black A fine particulate catalyst has an increased specific surface, and thus has increased activity per unit weight. Further, such fine particulate catalyst supported on carbon black does not aggregate with each other, and thus can be maintained as particles. It is desirable to select a specific surface of the carbon black to be used, in a range of 10 to 1000 m$^2$/g. This is because too small a specific surface achieves less effect of adding the carbon black. On the other hand, too large a specific surface means too many fine pores formed on the surface of the carbon black The catalyst particles enter the pores, and the catalyst particles that has entered the fine pores do not easily contribute to reactions when a cell operates.

In addition, carbon black with a primary particle diameter of approximately 20 to 200 nm may be used. Besides, a carbon nanotube or a carbon fiber may be used for a support.

It is preferable to use acidic hydrogen ion conducing materials as solid polymer electrolytes to be used in the anode 11 and the cathode 13, and as a solid polymer electrolyte to be used in the solid polymer electrolyte membrane 12, because a stable fuel cell can be provided without being affected by carbon dioxide gas in the atmosphere.

As such a material, sulfonated fluoropolymer materials, such as polyperfluorostyrene sulfonic acids, and perfluorocarbon sulfonic acids, sulfonated hydrocarbon polymer materials, such as polystyrene sulfonic acids, sulfonated poly ether sulfones, and sulfonated poly ether ether ketones, and alkylsulfonated hydrocarbon polymer materials may be used.

Additionally, solid polymer electrolytes to be used in the anode 11, the cathode 13, and the solid polymer electrolyte membrane 12 may be the same material or may different materials.

Preferably, the intermediate layer 14 is a porous layer that contains no catalyst, and formed of a solid polymer electrolyte and carbon black. Since the intermediate layer 14 serves as a hydrogen ion conducting pathway, the intermediate layer 14 needs to have hydrogen ion conductivity.

In addition, in order to hold the liquid fuel that has penetrated from the anode, the intermediate layer 14 needs to be porous. Inorganic particles of a metal oxide or the like, for example, may be used as a material for providing porous character. However, it is desirable to use carbon black since they are highly durable in the environment in which a fuel cell operates, and inexpensive.

In addition, in order to improve liquid fuel holding capability of the intermediate layer 14, the amount per unit volume of the solid polymer electrolyte contained in the intermediate layer 14 is preferably more than that of the solid polymer electrolyte contained in the cathode 13.

Figure 2:
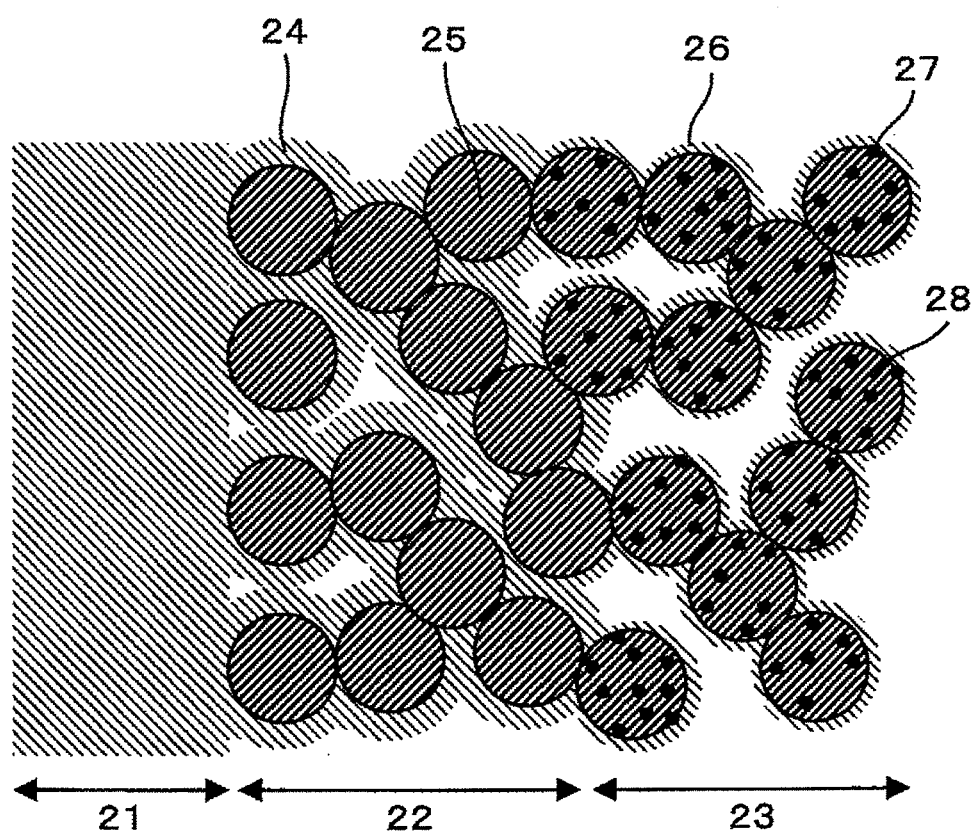
FIG. 2 is a schematic cross-sectional view showing a solid polymer electrolyte membrane, an intermediate layer, and a cathode according to the embodiment.

FIG. 2 shows a schematic cross-sectional view showing the solid polymer electrolyte membrane, the intermediate layer, and the cathode according to the embodiment. The intermediate layer 22 is formed between the solid polymer electrolyte membrane 21 and the cathode 23. In the intermediate layer 22, the solid polymer electrolyte 24 has a structure to cover carbon black 25, and the cathode 23 is similarly configured except that catalysts 27 are supported on carbon blacks 28.

Such a structure can be obtained by, for example, mixing a solvent in which the solid polymer electrolyte is dispersed and the carbon blacks 25 (or the carbon blacks 28 having the catalysts 27 supported thereon), and applying and drying the mixture. The amount of the solid polymer electrolyte 24 contained in the intermediate layer 22 is preferably larger than the amount of the solid polymer electrolyte 26 contained in the cathode 23.

The solid polymer electrolyte forming the intermediate layer may be of the same material as the solid polymer electrolyte used in the cathode, or may be of different materials. However, it is desirable that the solid polymer electrolyte used in the intermediate layer has a smaller contact angle to liquid fuel. This is because the liquid fuel holding capability of the intermediate layer can be made higher than that of the cathode. As a method of reducing the contact angle of an aqueous solution to the solid polymer electrolyte, there is a method of increasing the content of sulfonic acid group in a solid polymer.

In addition, when a material used in the intermediate layer is the same as the material used in the cathode, the amount of the solid polymer electrolyte in the intermediate layer is desirably more than that in the cathode, because this can increase the water collecting capability of the intermediate layer to more than that of the cathode.

In addition, the content of sulfonic acid group in the solid polymer electrolyte in the intermediate layer and the amount of the solid polymer electrolyte in the intermediate layer are desirably more than those in the cathode, because this can minimize an increase in hydrogen ion conducting resistance due to the formation of the intermediate layer.

A method of forming the intermediate layer between the solid polymer electrolyte membrane and the cathode is not particularly limited. For example, there is a method of spray-applying, onto a solid polymer electrolyte membrane, an alcohol solution in which a solid polymer electrolyte and carbon black are dispersed to form the intermediate layer, and then spray-applying, onto the intermediate layer, an alcohol solution in which a solid polymer electrolyte and carbon black supporting a catalyst are dispersed.

In order to check if the amount of the solid polymer electrolyte in the formed intermediate layer is larger than that of the cathode, the completed membrane electrode assembly is cut and the composition of the cross section is analyzed with SEM-EDX (a scanning electron microscope with an energy dispersive X-ray analyzer), for example.

It is desirable that the thickness of the intermediate layer is in a range of 1 to 100 μm. If the thickness is thinner than 1 μm, it is highly likely that a solid polymer electrolyte membrane is brought into a direct contact with the cathode due to irregular application, when the intermediate layer is formed on the solid polymer electrolyte membrane. In addition, if the thickness is thicker than 100 μm, it becomes difficult to achieve high output density because the hydrogen ion conducting resistance increases.

Figure 3:
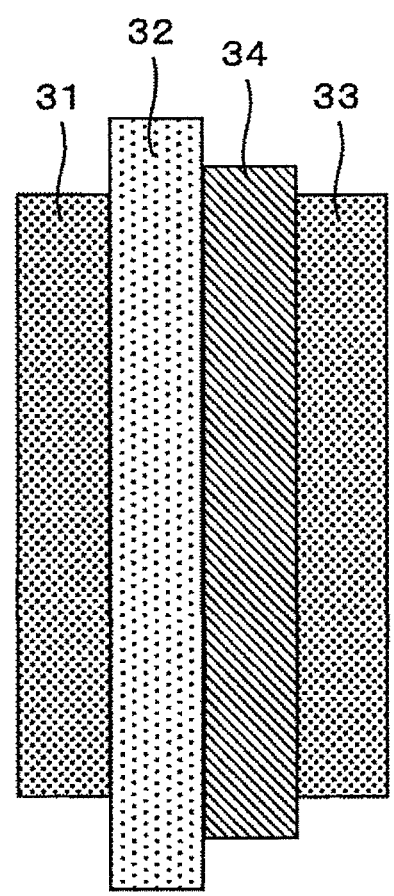
FIG. 3 is a schematic cross-sectional view showing the membrane electrode assembly for fuel cell according to the embodiment.

FIG. 3 shows a schematic cross-sectional view showing another membrane electrode assembly for fuel cell according to the embodiment. The assembly includes an anode 31 and a cathode 33 arranged on both sides, respectively, of a solid polymer electrolyte membrane 32, and an intermediate layer 34 between the solid polymer electrolyte membrane 32 and the cathode 33. Here, the intermediate layer 34 has a wider area than the cathode 33. This can prevent the solid polymer electrolyte membrane from being damaged and a hole from being made therein, at the boundary of an area of the solid polymer electrolyte membrane where the anode or the cathode is applied and an area where the anode or the cathode is not applied. In addition, with the configuration similar to the intermediate layer described above, the cathode 33 is prevented from being immersed in the liquid fuel, thereby enabling high output density to be acquired.

Figure 4:
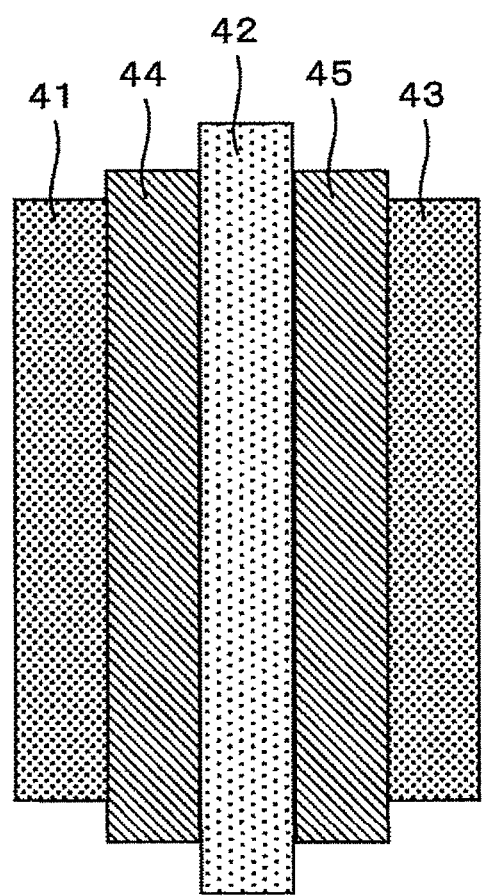
FIG. 4 is a schematic cross-sectional view showing the membrane electrode assembly for fuel cell according to the embodiment.

FIG. 4 shows a schematic cross-sectional view showing another membrane electrode assembly for fuel cell according to the embodiment. The assembly includes an anode 41 and a cathode 43 arranged on both sides, respectively, of a solid polymer electrolyte membrane 42, an intermediate layer 44 between the solid polymer electrolyte membrane 42 and the anode 41, and an intermediate layer 45 between the solid polymer electrolyte membrane 42 and the cathode 43. Arrangement of the intermediate layer 41 and the intermediate layer 45 both on the side of the anode 41 and on the side of the cathode 43, respectively, can further prevent the solid polymer electrolyte membrane from being damaged. Also in this arrangement, a configuration of the intermediate layer 45 can be made similar to that of the intermediate layer described above. A configuration of the intermediate layer 44 can be made similar to that of the intermediate layer 45.

When an area of the intermediate layer is made larger than that of the anode or the cathode, it is desirable to apply the anode or the cathode to the center of the intermediate layer as much as possible. Here, a distance from an end of the anode or the cathode to an end of the intermediate layer, which is larger than the cathode or the anode, is desirably 1 mm or more. If the distance is smaller than it, it becomes difficult to prevent the solid polymer electrolyte membrane from being damaged.

EXAMPLE 1

Examples of the membrane electrode assembly for fuel cell according to the embodiment will be specifically described hereinafter.

Ketjen black (manufactured by Lion Corporation, specific surface area of 800 m$^2$/g), which is a carbon black, and Nafion (registered trademark), which is a solid polymer electrolyte, were added to a solvent mainly containing propanol so as to provide the weight ratio of ketjen black to Nafion of 1:0.6, and the mixture was stirred for 12 hours by a magnetic stirrer. Then, the mixture was spray-applied to one side of a solid polymer electrolyte membrane so as to provide a weight of ketjen black of 0.5 g/cm$^2$. In this way, an intermediate layer was formed. Note that, the application area of the intermediate layer was 30×30 mm.

Next, ketjen black supporting 67 wt % of platinum, and Nafion (registered trademark) were added to a solvent mainly containing propanol so as to provide the weight ratio of ketjen black including platinum to Nafion of 1:0.2 (the weight ratio of ketjen black excluding platinum to Nafion (registered trademark) was 1:0.6, which was same as that in the intermediate layer), and the mixture was stirred for 12 hours by a magnetic stirrer. Then, the mixture was spray-applied onto the preformed intermediate layer as to provide a weight of ketjen black of 0.5 mg/cm$^2$. In this way, a cathode was formed. Note that, the application area of the cathode was 30×30 mm and the mixture was applied so as to overlap with the intermediate layer as much as possible.

In addition, ketjen black supporting 55 Wt % of platinum-ruthenium, and Nafion (registered trademark) were added to a solvent mainly containing propanol so as to provide a weight ratio of ketjen black including platinum-ruthenium to Nafion of 1:0.6, and the mixture was stirred for 12 hours by a magnetic stirrer. Then, the mixture was spray-applied to a surface opposite to the side of the cathode of the solid polymer electrolyte membrane so as to provide a weight of ketjen black of 0.8 mg/cm$^2$. In this way, an anode was formed. Note that, the application area of the anode was 30×30 mm.

Then, hot pressing for 2 minutes at 120° C. and 5 MPa resulted in the membrane electrode assembly according to Example 1.

Note that, in order to measure the thickness of the intermediate layer according to Example 1, the intermediate layer was separately spray-applied onto a polyimide film, which was then hot pressed for 2 minutes at 120° C. and 5 MPa. As a result of measuring the thickness of the obtained intermediate layer on the polyimide film with a micrometer, the thickness was 15 μm.

EXAMPLE 2

A membrane electrode assembly for fuel cell according to Example 2 was produced in the same manner as that in Example 1, except that, when an intermediate layer was formed, ketjen black and Nafion (registered trademark) were added to a solvent mainly containing propanol so as to provide a weight ratio of ketjen black to Nafion of 1:1.2.

EXAMPLE 3

A membrane electrode assembly for fuel cell according to Example 3 was produced in the same manner as that in Example 1, except that, when an intermediate layer was formed, ketjen black and Nafion (registered trademark) were added to a solvent mainly containing propanol so as to provide a weight ratio of ketjen black to Nafion of 1:1.8.

EXAMPLE 4

A membrane electrode assembly for fuel cell according to Example 4 was produced in the same manner as that in Example 1, except that, when an intermediate layer was formed, ketjen black and Nafion (registered trademark) were added to a solvent mainly containing propanol so as to provide a weight ratio of ketjen black to Nafion of 1:2.4.

COMPARATIVE EXAMPLE

A membrane electrode assembly for fuel cell according to Comparative Example was produced in the same manner as that in Example 1, except that a cathode was formed directly on a solid polymer electrolyte membrane, without forming an intermediate layer.
(Evaluation)

Output densities of the membrane electrode assemblies for fuel cell in Examples 1 to 4 and Comparative Example 1 were evaluated. Each fuel cell for evaluation was prepared by sandwiching a membrane electrode assembly for fuel cell between separators made of carbon and having flow paths for fuel and air with diffusion layers of porous carbon each interposed between the membrane electrode assembly and the corresponding one of the separators. The output densities were evaluated with electronic load equipment by setting temperature of a single cell at 60° C., while a 4 mol/l methanol-water solution was being supplied at 0.5 ml/min to the anode side of the fuel cell for evaluation, and air having a dew point of 40° C. was being supplied to the cathode side at 500 ml/min. Table 1 shows the relative values of the output densities at a load current density of 200 mA/cm$^2$.

TABLE 1

|  | Example 1 | Example 2 | Example 3 | Example 4 | Comparative Example 1 |
|---|---|---|---|---|---|
| Output Densities (Relative Values) | 1.00 | 1.64 | 4.69 | 1.76 | 0.91 |

Figure 5:
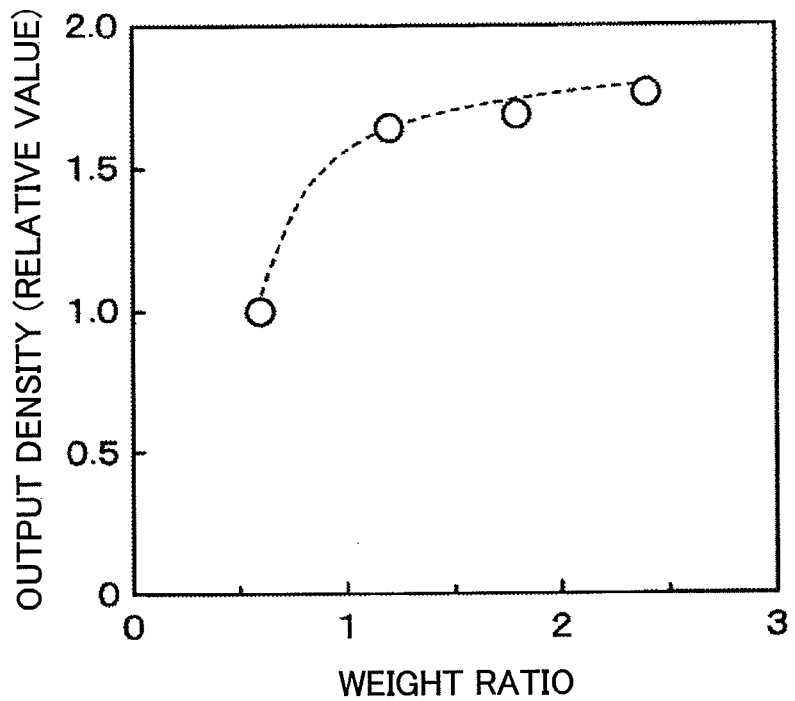
FIG. 5 shows a relation between the weight ratio of a solid polymer electrolyte to a carbon black in the intermediate layer and the relative value of output density at 200 mA/cm$^2$.

The membrane electrode assemblies for fuel cell in Examples 1 to 4 achieved higher output densities than the membrane electrode assembly for fuel cell in Comparative Example 1. In addition, among Examples 1 to 4, the output densities of Examples 2 to 4, in each of which the amount of the solid polymer electrolyte in the intermediate layer was higher than that of the cathode, were high. Fig. 5 shows a relation between the weight ratio of the carbon black to the solid polymer electrolyte in the intermediate layer (a value obtained by dividing the weight of the solid polymer electrolyte by the weight of the carbon black) and the relative value of the output density at 200 mA/cm$^2$. It was found out that making the weight ratio larger than that in the cathode had the effect of significantly improving the output density. It is believed that this was because the liquid fuel holding capability of the intermediate layer was higher than that of the cathode.

EXAMPLE 5

Ketjen black (manufactured by Lion Corporation, specific surface area of 800 m$^2$/g), which is a carbon black, and Nafion (registered trademark), which is a solid polymer electrolyte, were added to a solvent mainly containing propanol so as to provide a weight ratio of ketjen black to Nafion of 1:2.4, and the mixture was stirred for 12 hours by a magnetic stirrer. Then, the mixture was spray-applied to both sides of a solid polymer electrolyte membrane so as to provide a weight of ketjen black of 0.5 g/cm$^2$. In this way, an intermediate layer was formed. Note that, the application area of the intermediate layer was 35×35 mm.

Next, ketjen black supporting 67 wt % of platinum and Nafion (registered trademark) were added to a solvent mainly containing propanol so as to provide a weight ratio of ketjen black including platinum to Nafion of 1:0.2 (the weight ratio of ketjen black excluding platinum and Nafion (registered trademark) was 1:0.6, which was the same as that in the intermediate layer), and the mixture was stirred for 12 hours by a magnetic stirrer. Then, the mixture was spray-applied onto the preformed intermediate layer so as to provide a weight of ketjen black of 0.5 mg/cm$^2$. In this way, a cathode was formed. Note that, the area of the cathode was 30×30 mm, which was smaller than the area of the intermediate layer, and the cathode was applied to the center of the intermediate layer as much as possible, so that any ends did not stick out of the intermediate layer.

In addition, ketjen black supporting 55 wt % of platinum-ruthenium and Nafion (registered trademark) were added to a solvent mainly containing propanol so as to provide a weight ratio of ketjen black to Nafion of 1:0.6, and the mixture was stirred for 12 hours by a magnetic stirrer. Then, the mixture was spray-applied onto the surface of the intermediate layer opposite to the side of the cathode of the solid polymer electrolyte membrane so as to provide a weight of ketjen black of 0.8 mg/cm$^2$. In this way, an anode was formed. Note that, the area of the anode was 30×30 mm, which was smaller than the area of the intermediate layer, and the anode was applied to the center of the intermediate layer as much as possible, so that any ends did not stick out of the intermediate layer.

Then, hot pressing for 2 minutes at 120° C. and 5 MPa resulted in a membrane electrode assembly for fuel cell according to the Example 5.
(Evaluation 2)

Life of the membrane electrode assemblies of Example 5 and Comparative Example 1 was evaluated. Each membrane electrode assembly was incorporated into a single fuel cell similar to that in Evaluation 1 and the temperature of the single cell was set to 60° C. Electricity was continuously generated while keeping load current densities at 200 mA/cm$^2$ by using electronic load equipment. During this generation, a 4 mol/l methanol-water solution was being supplied to the anode side at 0.5 ml/min and air having the dew point of 40° C. was being supplied to the cathode side at 500 ml/min. As a result, the voltage of the fuel cell of Comparative Example 1 rapidly dropped after 510 hours had passed, whereas no such a phenomenon was observed for the fuel cell of Example 5. As a result of breaking down both fuel cells, it was observed that in the membrane electrode assembly of Comparative Example 1, the solid polymer electrolyte membrane was damaged and a hole was made, at the boundary of the area where the electrode was applied and the area where no electrode was applied, whereas there was no observable damage of the solid polymer electrolyte membrane in the membrane electrode assembly of Example 5.

Thus, the fuel cell using the membrane electrode assembly for fuel cell according to Example has high output density. In addition, the fuel cell using the membrane electrode assembly for fuel cell according to Example has a longer life.

Figure 6:
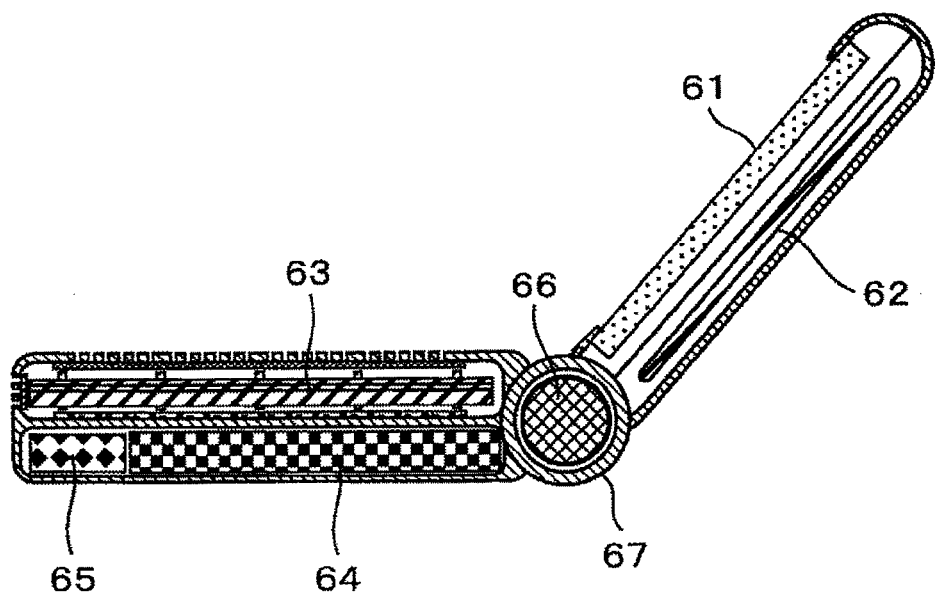
FIG. 6 is a schematic view showing a personal digital assistant according to the embodiment.

FIG. 6 shows an example in which the fabricated fuel cell was implemented in a personal digital assistant by way of example of a fuel-cell-power generation system.

The personal digital assistant has a folding structure in which two parts are coupled by a hinge 67 that also serves as a holder of a fuel cartridge 66.

One of the two parts has a display device 61 into which an input device of a touch panel type has been integrated, and a portion where an antenna 62 is built in.

The other one part has a main board 64 where a fuel cell 63, electronic devices such as a processor, volatile and non-volatile memories, a power controller, a fuel cell-secondary battery hybrid controller, a fuel monitor or the like and electronic circuits are implemented, and a portion where a lithium ion secondary battery 65 is mounted.

Since the output density of the fuel cell is high in the personal digital assistant thus obtained, the fuel cell 63 can be made smaller, which can thus achieve a lightweight and compact configuration. In addition, since the life of the fuel cell is long, the personal digital assistant can be used longer.

The present invention relates to a membrane electrode assembly used in a fuel cell, and such a membrane electrode assembly can be used in a direct methanol fuel cells.

EXPLANATION OF REFERENCE NUMERALS 11, 31, 41 . . . anode, 12, 21, 32, 42 . . . solid polymer electrolyte membrane, 13, 23, 33, 43 . . . cathode, 14, 22, 34, 44, 45 . . . intermediate layer, 24 . . . solid polymer electrolyte forming intermediate layer, 25 . . . carbon black forming intermediate layer, 26 . . . solid polymer electrolyte forming cathode, 27 . . . catalyst forming cathode, 28 . . . carbon black forming cathode, 61 . . . display device, 62 . . . antenna, 63 . . . fuel cell, 64 . . . main board, 65 . . . lithium ion secondary battery, 66 . . . fuel cartridge, 67 . . . hinge

What is claimed is:

1. A membrane electrode assembly for fuel cell, the membrane electrode assembly being adapted to use liquid fuel as fuel, comprising:
an anode including a catalyst and a solid polymer electrolyte;
a cathode including a catalyst and a solid polymer electrolyte;
a solid polymer electrolyte membrane formed between the anode and the cathode; and
an intermediate layer located between the cathode and the solid polymer electrolyte membrane, wherein the intermediate layer comprises a porous structure in which carbon black is covered with a solid polymer electrolyte and contains no catalyst, and wherein the amount of a solid polymer electrolyte per unit volume contained in the intermediate layer is larger than the amount of the solid polymer electrolyte per unit volume contained in the cathode.

2. The membrane electrode assembly for fuel cell according to claim 1, wherein
a contact angle of the solid polymer electrolyte contained in the intermediate layer to liquid fuel is smaller than a contact angle of the solid polymer electrolyte contained in the cathode to liquid fuel.

3. A membrane electrode assembly for fuel cell, the membrane electrode assembly being adapted to use liquid fuel as fuel, comprising:
an anode including a catalyst and a solid polymer electrolyte;
a cathode including a catalyst and a solid polymer electrolyte;
a solid polymer electrolyte membrane formed between the anode and the cathode, and
at least one of an intermediate layer located between the cathode and the solid polymer electrolyte membrane and an intermediate layer located between the anode and the solid polymer electrolyte membrane, wherein an area of each intermediate layer in a plane parallel to opposed major surfaces of each intermediate layer is larger than an area of the corresponding one of the cathode and anode in a plane parallel to opposed major surfaces of the corresponding one of the cathode and anode, wherein each intermediate layer comprises a porous structure in which carbon black is covered with a solid polymer electrolyte and contains no catalyst, and wherein the amount of a solid polymer electrolyte per unit volume contained in each intermediate layer is larger than the amount of the solid polymer electrolyte per unit volume contained in the corresponding one of the anode and the cathode.

4. The membrane electrode assembly for fuel cell according to claim 3, wherein
a contact angle of the solid polymer electrolyte contained in the intermediate layer to liquid fuel is smaller than a contact angle of the solid polymer electrolyte contained in the corresponding one of the anode and the cathode to liquid fuel.

5. A fuel cell comprising:
the membrane electrode assembly for fuel cell according to claim 1;
a member for supplying liquid fuel;
a member for supplying oxygen; and
a member for collecting power.

6. A fuel cell comprising;
the membrane electrode assembly for fuel cell according to claim 3;
a member for supplying liquid fuel;
a member for supplying oxygen; and
a member for collecting power.

7. A fuel-cell-power generation system comprising the fuel cell according to claim 5 mounted thereon.

8. A fuel-cell-power generation system comprising the fuel cell according to claim 6 mounted thereon.

* * * * *